March 18, 1941.    R. W. BAILEY    2,235,192
TORQUE CONTROLLED DRIVE
Filed July 31, 1940    3 Sheets-Sheet 2

INVENTOR.
Roy W. Bailey
BY
Samuel Weisman
ATTORNEY.

March 18, 1941.   R. W. BAILEY   2,235,192
TORQUE CONTROLLED DRIVE
Filed July 31, 1940   3 Sheets-Sheet 3

INVENTOR.
Roy W. Bailey
BY Samuel Weisman
ATTORNEY.

Patented Mar. 18, 1941

2,235,192

UNITED STATES PATENT OFFICE 2,235,192

TORQUE CONTROLLED DRIVE

Roy W. Bailey, Detroit, Mich., assignor to Detroit Power Screwdriver Company, Detroit, Mich., a corporation of Michigan Application July 31, 1940, Serial No. 348,638

8 Claims. (Cl. 74—259)

The present invention pertains to a novel two speed drive controlled by the torque of the load. More specifically, the invention is embodied in a machine for driving a member such as a stud, screw or nut and is designed to change its speed automatically when the unresisted driving action ends and the tightening action begins. Moreover, it is another object of the invention to provide means in the apparatus for terminating the tightening of the load member when a predetermined torque is developed.

The invention includes generally an upper driving spindle and a lower driven or work-engaging spindle, with transmission gearing and clutches between them. A clutch between the driving spindle and driven spindle is disengaged when the latter is off the work, while at this time another clutch locks the gearing to the transmission housing. When the spindles are brought against the work, the first clutch engages, and a direct drive results because of the locking of the gearing to the transmission housing by the second clutch.

When the actual tightening of the work piece begins, the increased resistance opposes and overcomes the second clutch, whereupon the transmission gearing is unlocked and tends to rotate the transmission housing oppositely to the drive spindle. The movement of the transmission housing is at this time obstructed by a one-way brake engaging the housing, with the result that the latter is stationary and a speed reduction is effected through the gearing.

The resistance of the brake is limited by an adjustable spring device so that, when a given torque is developed in the load member, the transmission housing assumes reverse rotation and absorbs the drive while the driven spindle remains stationary, thereby indicating the completion of the operation. The adjustment of the spring device determines the torque at which the driven spindle ceases to rotate. The apparatus is then removed from the work, whereupon the driven spindle is de-clutched to resume the first described position.

The invention is fully disclosed by way of example in the following description and in the accompanying drawings in which.

Reference to these views will now be made by use of like characters which are employed to designate corresponding parts throughout.

Figure 1:
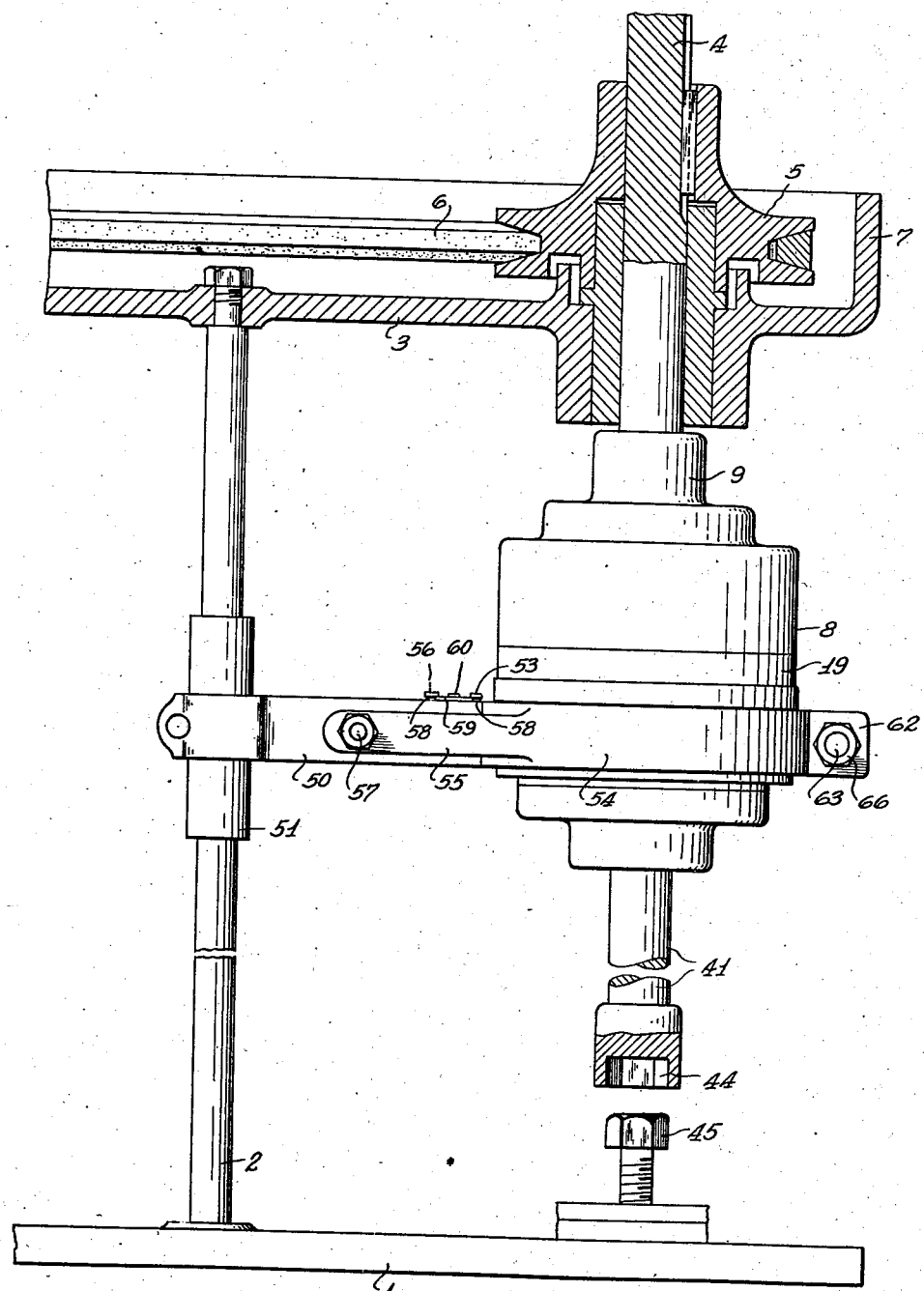
Figure 1 is an elevation of the machine, partly in section.
Figure 2:
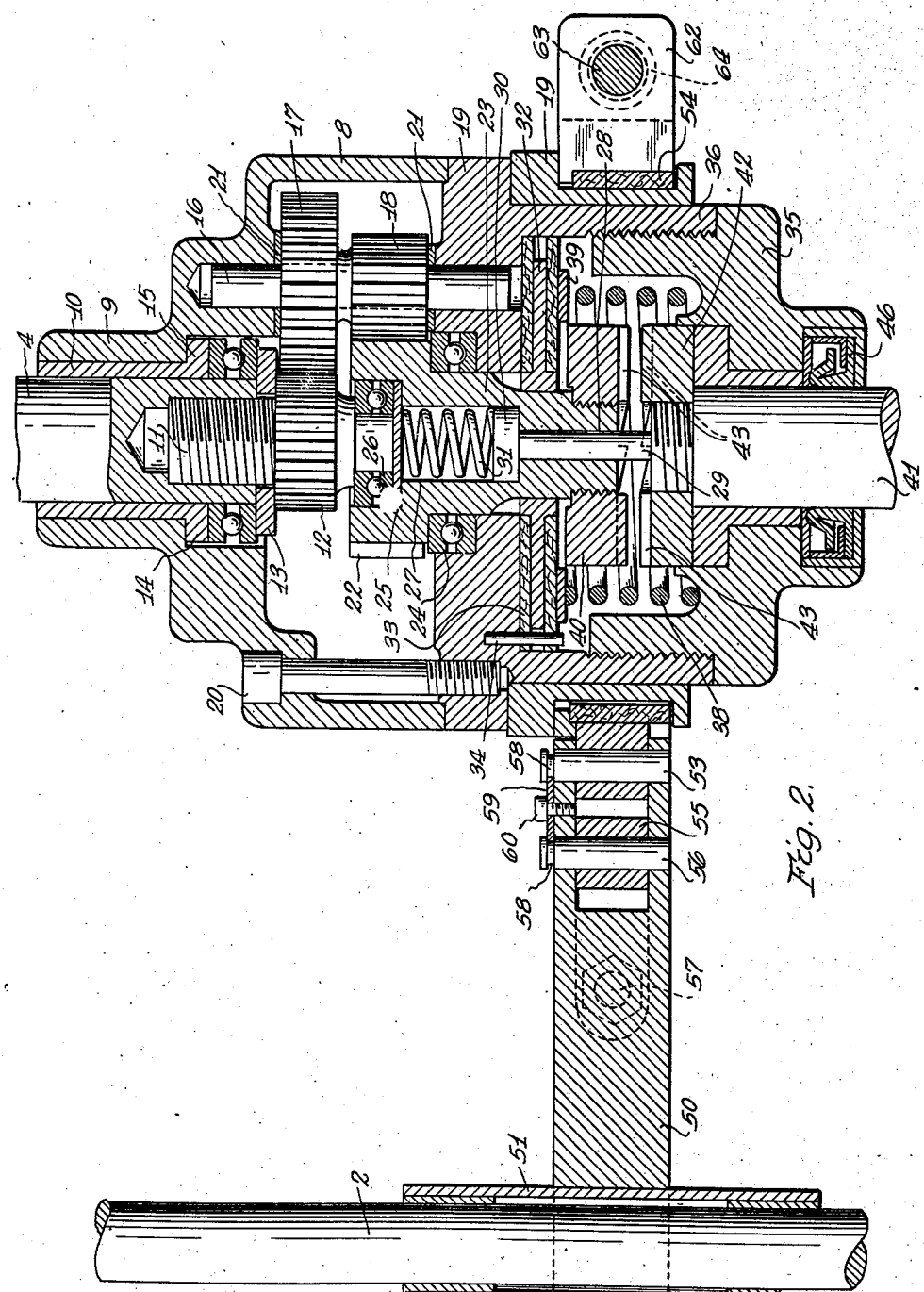
Figure 2 is a vertical section of the transmission mechanism.
Figure 3:
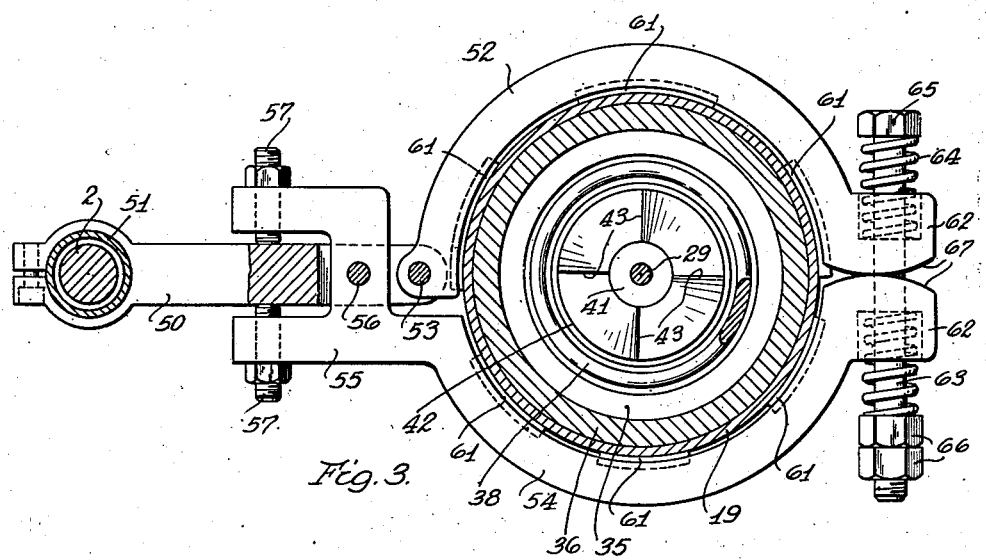
Figure 3 is a plan section of Figure 2.
Figure 4:
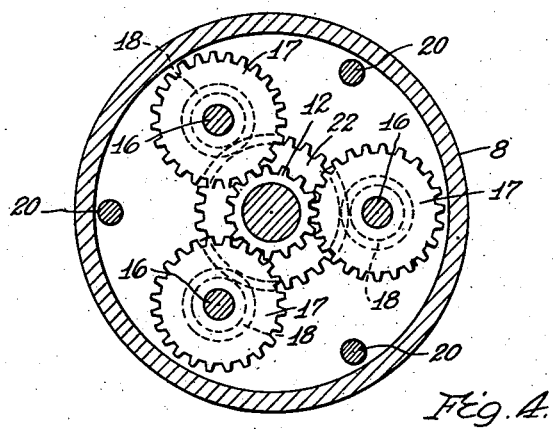
Figure 4 is a plan section in a different plane.

The frame of the machine includes a fixed table 1 and a vertical post 2 to which is secured a laterally extending bearing arm 3. In the latter is slidably mounted a vertical upper spindle 4 actuated to slide up and down at will by any suitable means known in the art or by the pedal mechanism shown in the patents to F. H. Dellaree Nos. 1,813,697; 1,862,845 and 1,866,880. On the spindle is splined a pulley 5 driven by a belt 6 or other suitable gearing. It will be noted that the arm 3 is shaped as a guard 7 for such a belt 6.

The description that follows is not necessarily in the order of assembly. At the lower end of the upper spindle 4 is a head or casing 8 having a reduced upper end 9 enclosing the lower end of the spindle but spaced therefrom for the insertion of a bushing 10. A shank 11 is screwed into the lower end of the spindle 4 and is formed as a pinion 12 within the casing 8. On the upper face of the pinion is mounted a collar 13 upon which in turn is mounted a thrust ball bearing 14 surrounding the shank 11 and engaging a flange 15 formed on the lower end of the bushing 10. Thus, it will be seen that the casing 3 and the parts contained therein are suspended from the collar 13.

A number of shafts 16, preferably three, are mounted vertically in the housing at 8 and concentrically around the gear 12. Each shaft carries a double gear including a larger gear member 17, meshing with the pinion 12, and below it a smaller gear member 18. The double gears may be either rotatable on fixed shafts 16 or fixed on rotatable shafts. The lower ends of shafts 16 are received in a lower casing section 19 attached to the main section 8 by bolts 20. Thrust washers 21 are mounted at both ends of the double gears to engage the adjacent casing sections.

Beneath the gear 12 is mounted a larger and co-axial gear 22 meshing with the smaller gear members 18, and having a shank 23 extending loosely into the section 19. The gear itself rests upon a ball bearing 24 mounted in the section 19. In the top of the gear 22 is inserted a disk 25 on which is mounted a ball bearing 26 engaging the bottom of the pinion 12. Below the disk 25, the gear 22 and shank 23 are formed with a cavity 27 reduced at 28 through the lower end of the shank. In the reduced portion of the cavity is slidably mounted a rod 29 having a head 30 in the larger cavity 27. A spring 31 in the cavity bears against the disk 25 and normally holds the rod 29 in a downward position.

At the lower face of the casing section 19 is mounted a clutch consisting of a metal disk 32 splined to the shank 23 and disposed between composition disks 33 attached to the section 19 by pins 34. A bottom housing piece 35 is screwed into a sleeve 36 formed at the bottom of the section 19. The member 35 has a cavity 37 containing a coil spring bearing against the friction clutch 32, 33 through the medium of a washer 39. Thus, the spring 38 causes the clutch to secure the gear 22 to the section 19 frictionally, at least initially, as will presently appear.

Directly below the clutch 32, 33 another clutch element 40 is screwed on the lower end of the shank 23. A lower spindle 41 is journalled in the member 35 and has a complementary clutch 42 screwed on its upper end. The rod 29 passes slidably through the element 40 and abuts the lower spindle 41, so that the clutch element 42 is normally disengaged from the element 40 under the action of the spring 31. The opposed faces of the members 40 and 42 are formed with radial lugs or abutments 43 adapted for interengagement in driving relation under the conditions presently to be described.

The lower end of the lower spindle 41 is suitably shaped for driving a member by rotation into a body. For example, the spindle may be formed with a wrench socket 44 to receive the head 45 of a screw. Within the scope of the invention, the spindle 41 may be formed as a screwdriver. The housing 8 is preferably filled with oil in view of which the member 35 is fitted with an oil seal 46 around the spindle 41.

In the initial operation of the device, the upper spindle 4 and parts suspended therefrom are lowered, first to engage the work with the lower spindle 41 and next to engage the clutch 40, 42 in opposition to the spring 31. As previously stated, the gear 22 is locked to the housing section 19 through clutch 32, 33 under pressure of spring 38. Consequently, all its gears are locked, and the entire mechanism turns as a unit, with a direct drive between upper spindle 4 and lower spindle 41.

This condition prevails until the torque load exceeds the resistance of the spring-engaged clutch 32, 33, whereupon the latter slips and a speed reduction is introduced. Generally speaking, the direct drive is maintained during unresisted driving of the work piece, and the clutch slips when resistance is introduced by the tightening of the work piece.

As the clutch slips the pinion 12 tends to drive the housing in the opposite direction. This reverse rotation, however, is resisted by a one-way brake, presently to be described, as a result of which the drive is transmitted entirely through the gears. In the construction shown the reduction is 4 to 1.

The brake is carried by an arm 50 slidably mounted on the post 2 by means of a sleeve 51. The brake consists essentially of two semi-circular shoes surrounding the housing section 19 and having a toggle connection permitting the housing to release the brake when turning in one direction and to lock it when turning in the other direction. One of the shoes 52 is attached directly to the arm 50 by a pivot pin 53. The other shoe 54 is formed with a fork 55 straddling the arm 50 and attached thereto by a pivot pin 56. The ends of the fork are fitted with adjustable set screws 57 at opposite sides of the arm 50 to limit the movement of the shoe 54 on the pivot end 56. The ends of both pivot pins are grooved at 58 to receive the forked ends of a retaining plate 59 which in turn is secured to the arm 50 by a stud 60.

The braking surfaces of the shoes 52 and 54 are provided with friction pads 61 or may be fully lined if desired. The free ends of the shoes are extended outwardly in the form of ears 62 and through them is passed a bolt 63. Springs 64 surround the ends of the bolt and bear against the respectively adjacent ears, one spring engaging the bolt head 65 and the other engaging one of a pair of lock nuts 66 on the threaded end.

These springs obviously hold the brake shoes against the member 19. However, the ears 62 have convex contacting surfaces 67 which permit a rocking action during clockwise rotation of the member 19, as the latter movement repels the shoe 54 by turning it on the pivot pin 56. In the opposite direction of rotation, the brake locks the housing until the torque is sufficient to overcome the springs 64 and repel the shoe 52.

The springs 64 are utilized to determine the maximum torque to be applied in tightening the work piece, and this torque is regulated by adjusting the tension of the springs 63, 64, by the lock nuts 66. When the housing is turned against the locking action of the brake, the lower spindle 41 is stationary.

When the operator observes the housing turning in the reverse direction, he knows that the work piece has been properly tightened. He then raises the upper spindle 4, whereupon the clutch 40, 42 is again disengaged by the spring 31 and the device is in position for the next operation.

To summarize, the operating cycle of the device has four phases as follows: (1) no driving connection between spindle 4 and lower spindle 41 before the beginning of an operation, while the clutch 40, 42 is disengaged, (2) direct drive from spindle 4 to spindle 41 while the latter engages the work and spindle 4 is brought down sufficiently to engage clutch 40, 42 (this is the unresisted driving phase), (3) low speed drive from spindle 4 to spindle 41 in tightening the work piece while clutch 32, 33 slips and the housing is locked in the brake, and (4) slippage of the housing in the brake to absorb the drive and leave the lower spindle 41 stationary when the predetermined tightening torque has been developed.

Although a specific embodiment of the invention has been illustrated and described, it will be understood that various alterations in the details of construction may be made without departing from the scope of the invention as indicated in the appended claims.

What I claim is:

1. A drive mechanism comprising a tool driving shaft, a housing rotatably supported thereon, a transmission gear mechanism in said housing and connected to said drive shaft, a driven shaft extending from said housing and adapted to be driven by said transmission mechanism, a friction clutch normally locking said mechanism to said housing, adapted to slip on development of torque in said driven shaft, and a one-way slip brake engaging said housing, permitting unresisted rotation of said housing in the direction of said drive shaft and yieldingly resisting rotation in the opposite direction.

2. A drive mechanism comprising a tool driving shaft, a housing rotatably supported thereon, a transmission gear mechanism in said housing and connected to said drive shaft, a driven shaft extending from said housing adapted to be driven by said transmission mechanism, a friction clutch normally locking said mechanism to said housing, adapted to slip on development of torque in said driven shaft, a one-way slip brake engaging said housing, permitting unresisted rotation of said housing in the direction of said drive shaft and yieldingly resisting rotation in the opposite direction, and, resilient means determining and limiting the resistance of said brake to rotation of said housing in said opposite direction, whereby said housing turns in said opposite direction on development of sufficient torque in said driven shaft to overcome said resilient means.

3. A drive mechanism comprising a tool driving shaft, a housing rotatably supported thereon, a transmission gear mechanism in said housing and connected to said drive shaft, a driven shaft extending from said housing adapted to be driven by said transmission mechanism, a friction clutch normally locking said mechanism to said housing, adapted to slip on development of torque in said driven shaft, a one-way slip brake engaging said housing, permitting unresisted rotation of said housing in the direction of said drive shaft and yieldingly resisting rotation in the opposite direction, and adjustable resilient means determining and limiting the resistance of said brake to rotation of said housing in said opposite direction, whereby said housing turns in said opposite direction on development of sufficient torque in said driven shaft to overcome said resilient means.

4. A drive mechanism comprising a tool driving shaft, a housing rotatably supported thereon, a transmission gear mechanism in said housing and connected to said drive shaft, a driven shaft extending from said housing and adapted to be driven by said transmission mechanism, and a one-way slip brake engaging said housing, permitting unresisted rotation of said housing in the direction of said drive shaft and yieldingly resisting rotation in the opposite direction.

5. A drive mechanism comprising a tool driving shaft, a housing rotatably supported thereon, a transmission gear mechanism in said housing and connected to said drive shaft, a driven shaft extending from said housing and adapted to be driven by said transmission mechanism, and a one-way slip brake engaging said housing, permitting unresisted rotation of said housing in the direction of said drive shaft and yieldingly resisting rotation in the opposite direction, and resilient means determining and limiting the resistance of said brake to rotation of said housing in said opposite direction, whereby said housing turns in said opposite direction on development of sufficient torque in said driven shaft to overcome said resilient means.

6. A drive mechanism comprising a tool driving shaft, a housing rotatably supported thereon, a transmission gear mechanism in said housing and connected to said drive shaft, a driven shaft extending from said housing and adapted to be driven by said transmission mechanism, a clutch between said mechanism and said driven shaft, a spring holding said clutch disengaged when there is no axial pressure on said driven shaft, and a friction clutch normally locking said mechanism to said housing and adapted to slip on development of torque in said driven shaft, and a one-way slip brake engaging said housing, permitting unresisted rotation of said housing in the direction of said drive shaft and yieldingly resisting rotation in the opposite direction.

7. A drive mechanism comprising a tool driving shaft, a housing rotatably supported thereon, a transmission gear mechanism in said housing and connected to said drive shaft, a driven shaft extending from said housing and adapted to be driven by said transmission mechanism, a clutch between said mechanism and said driven shaft, a spring holding said clutch disengaged when there is no axial pressure on said driven shaft, a friction clutch normally locking said mechanism to said housing and adapted to slip on development of torque in said driven shaft, a one-way slip brake engaging said housing, permitting unresisted rotation of said housing in the direction of said drive shaft and yieldingly resisting rotation in the opposite direction, and resilient means determining and limiting the resistance of said brake to rotation of said housing in said opposite direction, whereby said housing turns in said opposite direction on development of sufficient torque in said driven shaft to overcome said resilient means.

8. A drive mechanism comprising a tool driving shaft, a housing rotatably supported thereon, a gear attached to said drive shaft, a driven shaft extending from said housing, another gear in said housing adapted to rotate said driven shaft, reduction gears connecting the first named and second named gears, and a friction clutch normally locking said gears to said housing and adapted to slip on development of torque in said driven shaft, a one-way slip brake engaging said housing, permitting unresisted rotation of said housing in the direction of said drive shaft and yieldingly resisting rotation in the opposite direction, and resilient means determining and limiting the resistance of said brake to rotation of said housing in said opposite direction, whereby said housing turns in said opposite direction on development of sufficient torque in said driven shaft to overcome said resilient means.

ROY W. BAILEY.